(12) United States Patent
Levine et al.

(10) Patent No.: US 8,558,160 B2
(45) Date of Patent: Oct. 15, 2013

(54) CMOS IMAGER WITH COMPANDED COLUMN SIGNALS

(75) Inventors: Peter Alan Levine, West Windsor, NJ (US); Rui Zhu, East Brunswick, NJ (US); John Robertson Tower, Yardley, PA (US); Thomas Lee Vogelsong, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 324 days.

(21) Appl. No.: 13/114,694

(22) Filed: May 24, 2011

(65) Prior Publication Data

US 2011/0290983 A1    Dec. 1, 2011

Related U.S. Application Data

(60) Provisional application No. 61/409,311, filed on Nov. 2, 2010, provisional application No. 61/351,052, filed on Jun. 3, 2010, provisional application No. 61/347,972, filed on May 25, 2010.

(51) Int. Cl.
*H01L 27/146*    (2006.01)

(52) U.S. Cl.
USPC .................................................. 250/208.1

(58) Field of Classification Search
USPC .................................................. 250/208.1
See application file for complete search history.

(56) References Cited

U.S. PATENT DOCUMENTS

| 7,627,239 | B2 * | 12/2009 | Terayama | 396/123 |
| 2004/0051029 | A1 * | 3/2004 | Hirai | 250/201.2 |

* cited by examiner

*Primary Examiner* — Tony Ko
(74) *Attorney, Agent, or Firm* — Marger Johnson & McCollom PC

(57) ABSTRACT

A non-linear conversion capability within an on-chip, per-column analog-to-digital converter (ADC) is provided to expand a compressed analog signal such that the resulting digital output that has a predetermined (linear or non-linear) mapping with respect to input brightness level of an incoming light signal to a row of pixels. The predetermined mapping may also be provided by a non-linear amplifier coupled to a linear or non-linear ADC and a resulting compressed non-linear digital representation at the output of the ADC is substantially linearized by an on-chip or an off-chip look-up table (LUT).

33 Claims, 3 Drawing Sheets

Nonlinear analog element and non-linear ADC in CMOS imager column.

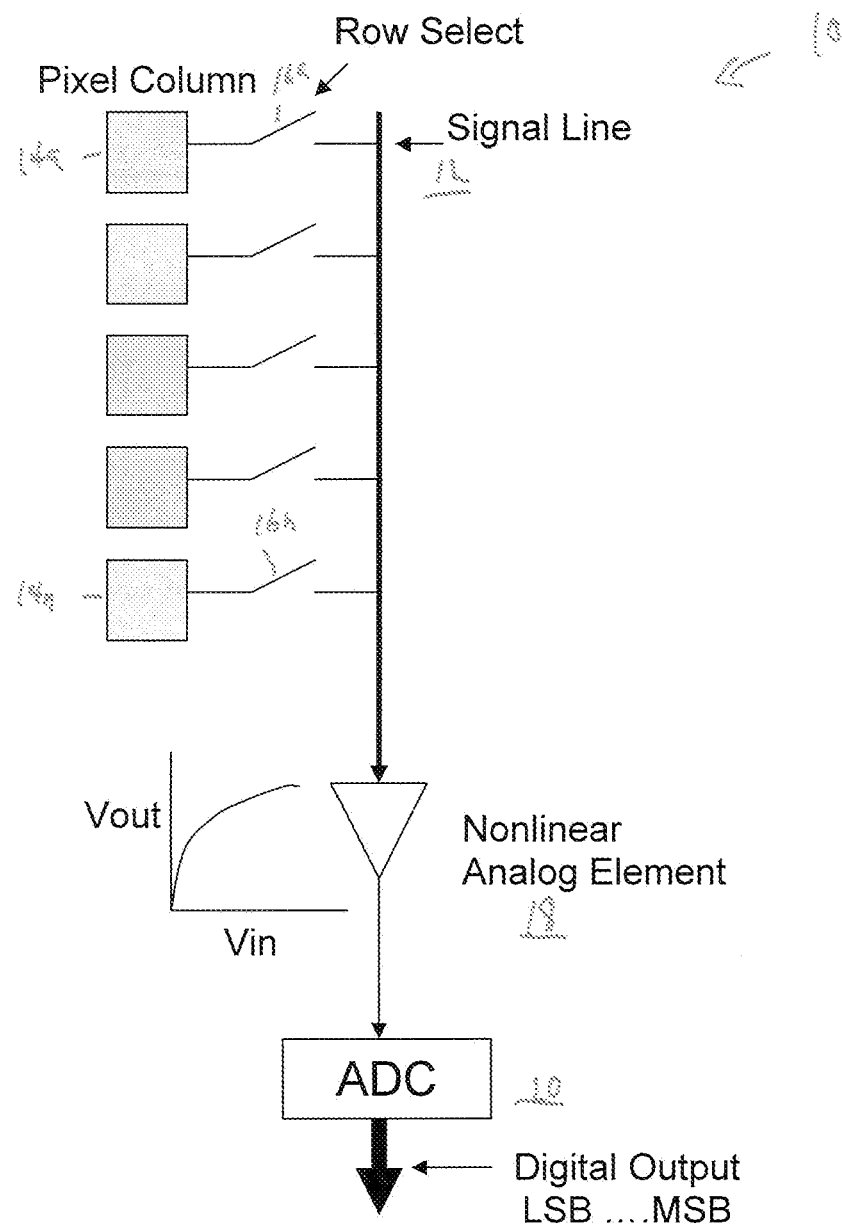
Figure 1. Nonlinear analog element in CMOS imager column.

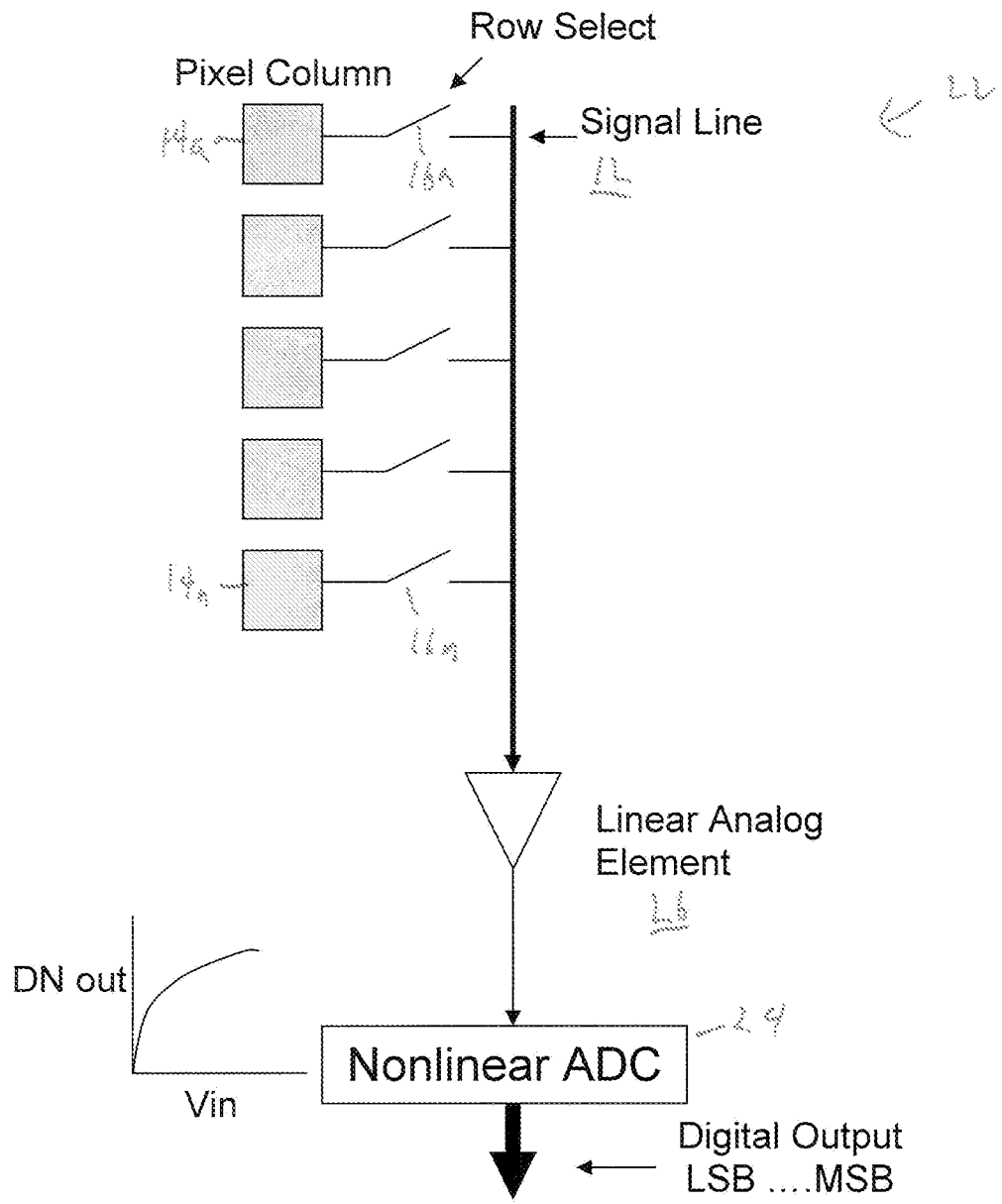
Figure 2. Nonlinear ADC in CMOS imager column.

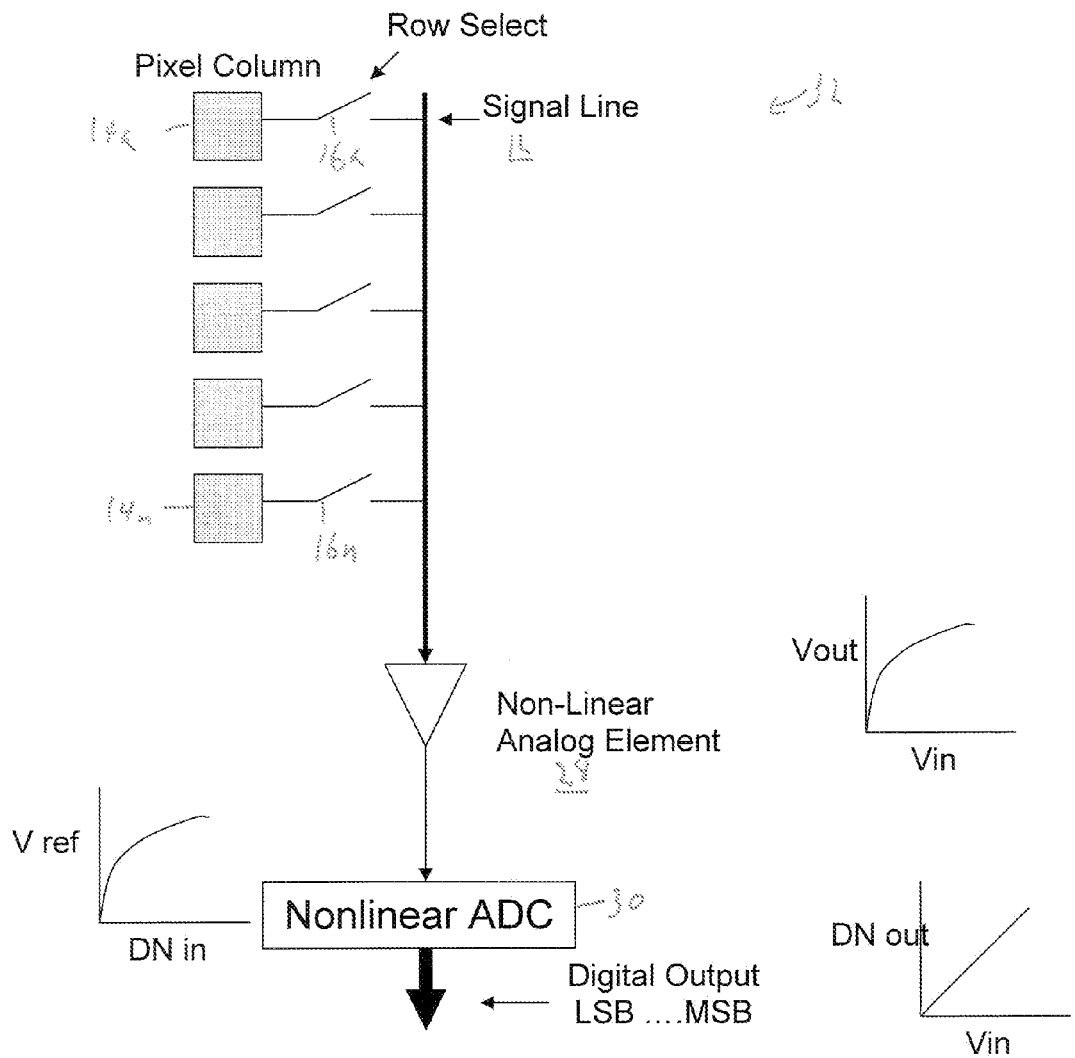
Figure 3. Nonlinear analog element and non-linear ADC in CMOS imager column.

CMOS IMAGER WITH COMPANDED COLUMN SIGNALS

CROSS-REFERENCE TO RELATED APPLICATION

This application claims the benefit of U.S. provisional patent application No. 61/347,972 filed May 25, 2010, U.S. provisional patent application No. 61/351,052 filed Jun. 3, 2010, and U.S. provisional patent application No. 61/409,311 filed Nov. 2, 2010, the disclosures of which are incorporated herein by reference in their entirety.

FIELD OF THE INVENTION

The invention relates generally to imaging devices. More specifically, the invention relates to CMOS imagers that employ a single A/D converter per column having a compressed non-linear pixel output signal that is linearly or non-linearly companded in either the analog or digital domains.

BACKGROUND OF THE INVENTION

Generally, an image sensor is a semiconductor device for converting an optical image into an electric signal. There are a number of different types of semiconductor-based imagers, including charge coupled devices (CCDs), photodiode arrays, charge injection devices, hybrid focal plane arrays, etc. The various types of image sensors may be broadly categorized as charge coupled devices (CCD) and complementary metal oxide semiconductor (CMOS) image sensors.

In recent years, there has been increased interest in CMOS imagers for possible use as low cost imaging devices. CMOS image sensors are now used in many digital applications such as, for example, in cameras, scanners, machine vision systems, vehicle navigation systems, video telephones, computer input devices, surveillance systems, star trackers, motion detection systems, image stabilization systems and high-definition television imaging devices.

In a conventional CMOS pixel, an electrical signal representing input light brightness is converted to a corresponding electrical signal by, for example, a pinned photodiode. Readout circuitry couples the converted electrical signal in the form of an output voltage from a row transistor to an output terminal. In applications, a column of CMOS pixels may be coupled to the same output terminal. By selectively applying a row address signal to the gate of a selected row transistor, a selected one of the CMOS pixels may be coupled to the output terminal.

A prior art method for converting an analog signal present on a column out to a digital signal for use by digital imager circuitry using A/D conversion requires two ADCs per column to obtain a large dynamic range per column. There is a high gain channel provided to an input of a first ADC and low gain channel provided to an input of a second ADC. The high gain channel is relatively immune to noise but saturates the first ADC at a relative low input signal level. The low gain channel provides for a much larger input signal to the second ADC but is subject to a relatively high referred electron noise. The two ADC outputs may be spliced to form a single data signal with fewer bits having low noise and large dynamic range.

For example, the high gain ADC provides a saturation level of 1000 e/pixel (i.e., charges per pixel) relative to a pixel full signal of 25,000 e/pixel. The second ADC has low front end gain and provides for an input signal of up to 25,000 e/pixel at saturation but has relatively high noise because of low front end gain. The two spliced ADC output form a single digital signal having noise of about 2 e/pixel (rms) and a full signal of 25,000 e/pixel. When employing this ADC architecture, the pixel itself needs to provide an output signal over this full dynamic range.

For imagers that operate at relatively high data rates, such as one having 5 Megapixels and configured to operate at 100 fps, typically 8 to 16 digital output ports may be required. For the dual ADC per column approach using 11-bit ADCs, about 174 extra bonds pads and package pins are required. This results in higher packaging costs, greater camera complexity and higher on-chip power dissipation. Increased chip power dissipation is undesirable because it may result in a higher dark, resulting in an imager that has reduced sensitivity or a need for increased cooling.

Accordingly, what would be desirable, but has not yet been provided, is CMOS imager having a single ADC per column capable of achieving both low noise and a large full signal (dynamic range).

SUMMARY OF THE INVENTION

The above-described problems are addressed and a technical solution achieved in the art by providing an imager comprising a plurality of pixels each including a row select transistor coupled to a column, comprising: an analog element coupled to at least one column having an output configured to provide a non-linear signal corresponding to a signal of the selected one of the pixels; and a digital element configured to produce a predetermined mapping of the non-linear signal provided by the analog element. The imager may further comprise an analog-to-digital converter (ADC) coupled to the analog element and the digital element and configured to provide a digital representation of an output of the analog element.

According to an embodiment of the present invention, the digital element may be configured to substantially linearize the digital representation provided by the ADC. The digital element may substantially linearize the digital representation provided by the ADC using a look-up table (LUT). The digital element may be a processor, an ASIC, or an FPGA.

According to an embodiment of the present invention, the analog element may be an amplifier having a non-linear output characteristic. The analog element may be implemented by a multi-level breakpoint circuit that provides a multi-step linear conversion curve with a set number of breakpoints, wherein the slope of each of the curves decreases at each breakpoint. The analog element may be implemented separately or as part of an analog CDS circuit.

According to an embodiment of the present invention, the digital element may be configured to result in a non-linear digital representation provided by the ADC.

According to an embodiment of the present invention, the predetermined mapping may produce a signal that is compressed at higher levels of the signal of the selected one of the pixels. The compressed signal may have, for example, a square root characteristic.

The above-described problems are addressed and a technical solution achieved in the art by providing an imager comprising a plurality of pixels each including a row select transistor coupled to a column, comprising: a first analog element coupled to at least one column having an output configured to provide a non-linear signal corresponding to a signal of the selected one of the pixels; and a second analog element configured to produce a predetermined mapping of the non-linear signal provided by the first analog element. The imager may further comprise an analog-to-digital converter (ADC)

coupled to the first analog element and the second analog element and configured to provide a digital representation of the output of the first analog element.

According to an embodiment of the present invention, the first analog element may be an amplifier having a non-linear output characteristic. The first analog element may be implemented by a multi-level breakpoint circuit that provides a multi-step linear conversion curve with a set number of breakpoints, wherein the slope of each of the curves decreases at each breakpoint.

According to an embodiment of the present invention, the second analog element provides a compressed signal at higher levels of input signal corresponding to the signal of the selected one of the pixels. The compressed signal may have, for example, a square root characteristic. An output of the second analog element may coupled to a reference input of the ADC.

According to an embodiment of the present invention, the reference input may be provided by an output of a non-linear digital-to-analog converter (DAC). The non-linear DAC may be supplied by a digital element configured to substantially linearize the digital representation provided by the ADC. The digital element may substantially linearize the digital representation provided by the ADC using a look-up table (LUT). The non-linear DAC may be configured to provides a decompressed signal at higher levels of input signal corresponding to a compressed signal provided by the first analog element.

According to an embodiment of the present invention, an ADC may be used to digitize more than one column.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 1 shows a hardware block diagram of a CMOS imager that has a nonlinear response in the analog domain ahead of a single ADC per CMOS imager column, according to an embodiment of the present invention;

FIG. 2 shows a hardware block diagram of a CMOS imager that is configured to have a nonlinear response as an integral part of a non-linear ADC, according to an embodiment of the present invention; and FIG. 3 depicts a nonlinear analog element and a non-linear ADC in a CMOS imager column, according to an embodiment of the present invention.

It is to be understood that the attached drawings are for purposes of illustrating the concepts of the invention and may not be to scale.

DETAILED DESCRIPTION OF THE INVENTION

Certain embodiments of the present invention pertain to CMOS imagers that produce low noise and have a high dynamic range by employing a single analog-to-digital converter (ADC) per column. The present invention is not strictly limited to a single ADC per column in a CMOS imager. The concept is equally applicable to one or more ADCs supporting a plurality of columns or to an off chip ADC.

One method of converting analog signals into a digital representation is to use a single slope ADC. In a single slope ADC, an input signal is constantly compared with a reference level. This reference level is typically a ramp that increases linear from a minimum analog voltage level to a maximum analog voltage level. While the reference input signal is ramping, a digital counter counts from 0 corresponding to the lowest analog voltage level to $2^{N-1}$ (where N is the number of bits in the ADC, e.g., 12 bits) corresponding to the highest analog voltage level. When the input signal is equal to the reference signal, the comparator triggers a latch to hold the value of the digital counter at that moment. Thus, a digital representation of the analog input voltage value is obtained. Note that it may take $2^N$ clock cycles to complete a conversion.

FIG. 1 shows a hardware block diagram of a CMOS imager that has a nonlinear response in the analog domain ahead of a single ADC per CMOS imager column, according to an embodiment of the present invention. The CMOS imager 10 comprises a column 12 of pixels 14a-14n. Each of the pixels 14a-14n is coupled to the column 12 via a corresponding one of a plurality of row select transistors 16a-16n. An output voltage present on a selected one of the pixels 14a-14n is fed via the column 12 to a non-linear analog element 18, which may be, but is not limited to, an amplifier having a non-linear output characteristic. The non-linear analog element 18 provides a non-linear, or compressed, analog voltage signal corresponding to an input signal response of the selected one of the pixels 14a-14n. According to an embodiment of the present invention, pixel voltage is nearly linear with respect to faceplate illumination over a normal operating range. Typically the column 12 includes a correlated double sampling (CDS) function implemented with either analog or digital circuits (not shown). CDS is well know in the art. The non-linear analog element 18 may be implemented separately or as part of an analog CDS circuit.

The resulting non-linear analog signal output by the non-linear analog element 18 is digitized by an analog-to-digital converter (ADC) 20. If the ADC provides a linear conversion, then the digital signal that exits the ADC provides a non-linear representation of the brightness value of the selected one of the pixels 14a-14n. As a result, the column 12 has a nonlinear ADC output response with respect to output voltage of the pixels 14a-14n.

FIG. 2 shows a hardware block diagram of a CMOS imager 22 that is configured to have a nonlinear response as an integral part of a non-linear ADC 24, according to an embodiment of the present invention. The CMOS imager 22 comprises a column 12 of pixels 14a-14n. Each of the pixels 14a-14n is coupled to the column 12 via a corresponding one of a plurality of row select transistors 16a-16n. An output voltage present on a selected one of the pixels 14a-14n is fed via the column 12 to a linear analog element 26, which may be, but is not limited to, an amplifier having a linear output characteristic. The resulting linear analog signal output of the linear analog element 26 is digitized by the non-linear ADC 24. The digital signal that exits the non-linear ADC 24 provides a non-linear representation of the brightness value of the selected one of the pixels 14a-14n. As a result, the column 12 has a nonlinear ADC output response with respect to output voltage of the pixels 14a-14n.

The non-linear ADC 24 provides a non-linear, or compressed, digital output signal corresponding to an input signal response of the selected one of the pixels 14a-14n. According to an embodiment of the present invention, pixel voltage is nearly linear with respect to faceplate illumination over a normal operating range. Typically the column 12 includes a correlated double sampling (CDS) function implemented with either analog or digital circuits (not shown). The linear analog element 26 may be implemented separately or as part of an analog CDS circuit.

The non-linear ADC 24 may produce a non-linear digital output by any one of several means. For example, if the non-linear ADC 24 is a single or dual slope ADC, a non-linear ADC response may be produced in the analog domain by means of a non-linear element introduced in the signal path within the non-linear ADC 24 (not shown). Alternatively, the non-linear element may be introduced as part of a non-linear reference within the non-linear ADC 24 (not shown). In still another embodiment, the input signal and the reference may be linear, but a counter counts in a non-linear fashion, say, for example, by extending higher bit counts over a longer period of time over lower bit counts.

The predetermined nonlinear response of any of these methods is such that at low input signal level the gain is high enough to overcome subsequent noise of the ADC and other circuits. Gain required to overcome ADC noise may be in the range of 20 to 100 times but may also extend beyond this range which depends upon the imager design and application.

For both the embodiment of FIGS. 1 and 2 for which a non-linear analog element is introduced either externally or internally to an ADC, a high front end gain required for a low digitized noise floor may saturate the output of the non-linear analog element or the ADC or both at an undesirably low charge signal, resulting in clipped high light signals. To permit high light gray scale to be resolved, the nonlinear element is configured to have a reduced gain characteristic as a signal on its input increases so as not saturate the ADC. As the amplifier gain is compressed at higher light levels, the slope of the transfer function of DN/volt (digital number/volt) at the output of the ADC decreases.

In a preferred embodiment, each column 12 has the same nonlinear transfer function, although they may be unequal for some applications.

For both the embodiments depicted in FIGS. 1 and 2, the digitized signal of the ADC 20, 24 may be substantially linearized in the digital domain to provide a correct image. This is effected on or off the imager chip. This non-linear representation is corrected (e.g., in a processor, ASIC, FPGA, etc.) with a digital conversion means such as a look-up table.

FIG. 3 depicts a nonlinear analog element 28 and a non-linear ADC 30 in a CMOS imager column 12, according to an embodiment of the present invention. The ADC 30 of FIG. 3 employs a minimal amount of circuitry, therefore enabling many ADCs to be placed on an imager chip with the image sensor, including up to one or more ADCs per column. Other ADC implementations such as a dual slope converter may use a similar method to obtain a non-linear conversion.

The CMOS imager 32 comprises a column 12 of pixels 14a-14n. Each of the pixels 14a-14n is coupled to the column 12 via a corresponding one of a plurality of row select transistors 16a-16n. An output voltage present on a selected one of the pixels 14a-14n is fed via the column 12 to a non-linear analog element 18, which may be, but is not limited to, an amplifier having a non-linear output characteristic. The non-linear analog element 18 provides a non-linear, or compressed, analog voltage signal corresponding to an input signal response of the selected one of the pixels 14a-14n. According to an embodiment of the present invention, pixel voltage is nearly linear with respect to faceplate illumination over a normal operating range.

The resulting linear analog signal output of the non-linear analog element 18 is then digitized by a non-linear ADC 30. According to an embodiment of the present invention, a non-linear analog element 18 which compresses its output voltage for high levels of input signal is substantially linearized by a non-linear reference input (not shown) to the non-linear ADC 30 which decompresses its input signal such that the output of the non-linear ADC 30 has a linear characteristic. The digital signal that exits the non-linear ADC 30 may provide a linear representation of the brightness value of the selected one of the pixels 14a-14n.

The compressed analog signal is transmitted to an on-chip non-linear ADC 30. One novel aspect of the present invention as depicted in FIG. 3 is that the reference analog signal need not be a linear ramp. It may be any monotonically increasing or decreasing function. This ramp may be provided by many different means. Within the non-linear ADC 30 of FIG. 3, according to an embodiment of the present invention, a non-linear analog reference signal is provided by an off-chip or on-chip DAC. The DAC is supplied by a digital signal coming from an LUT. The look-up table has values that provide the curve shown in the left side of FIG. 3 of $V_{ref}$ vs. $DN_{in}$. In such circumstances, the LUT is programmed to have the same breakpoints and slopes as the compression curve. The resulting transfer function from V in to DN out is linear as shown in the lower right of FIG. 3.

According to an embodiment of the present invention, the input to LUT may be a counter that counts from 0 to $2^{(M-1)}$, and the output of the LUT has P bits, where P is the number of bits in the DAC (e.g., 16 bits). Typically M is approximately the same as N is the number of bits in the ADC (e.g., 12 bits) to minimize conversion time. Typically P>M and the DAC output is filtered so that the resulting analog reference (not shown) is a smooth precisely controlled curve. If the LUT provides a digital output value equal to the digital input value, the single slope ADC operates linearly. If a different LUT mapping is used, the analog reference signal follows that mapping. One such mapping is to have a mapping curve that is equal to the compression occurring in the analog domain at the pixel 14a-14n as described previously. Such a mapping curve provides a digital output signal that is linearly related to the light level at the pixel 14a-14n prior to compression.

Alternative mapping curves other than pure expansion of the compressed analog signal may be applied as well if desired at a system level. According to an embodiment of the present invention, one such mapping curve that may produce any desired predetermined or programmable non-linear output signal (analog or digital). Another such mapping is to employ an expansion curve between a linear curve shown in FIG. 1 and the expansion curve shown in FIG. 3, such that the quantization noise of the non-linear ADC 30 is always maintained to be slightly below the shot noise of the signal itself, while minimizing the number of bits in the non-linear ADC 30 and therefore conversion time and power consumption. The mapping curve in this instance generally follows a square root function, since the shot noise of a light input signal is equal to the square root of the value of the light input.

Referring again to FIG. 3, the non-linear analog element 18 compresses the bright areas of the image as shown in the curve of $V_{out}$ vs. $V_{in}$ on the top right of FIG. 3. According to an embodiment of the present invention, the non-linear analog element 18 may be implemented by a multi-level breakpoint circuit (not shown). The multi-level breakpoint circuit provides a multi-step linear conversion curve with a set number of breakpoints, where the slope of each of the curves decreases at each breakpoint. The positioning of the breakpoints and the slope from breakpoint to breakpoint are programmable by setting the reset timing and reset level.

According to an embodiment of the present invention, the counter of the non-linear ADC 30 may be non-linear in the sense that a count from one bit to the next may vary in time with a linear reference input. This embodiment results in the same non-linear ADC curve as shown in FIG. 3, although conversion time may increase or decrease.

Since the circuitry of the non-linear ADC 30 is simple, there may be many copies of the non-linear ADC 30 on chip, such as one ADC per column such that the signal from each column may be converted from analog to digital in parallel during one line readout time. The analog reference provided from the DAC may be provided in parallel to all of the ADCs.

The non-linear circuit element/non-linear ADC technique of FIG. 3 has several advantages over prior art non-linear ADC conversion techniques. No off-chip digital conversion is required to provide a linear response. An additional advantage of the non-linear reference signal is that there are the same number of ADUs (i.e., a single bit of an ADC) per incremental increase in light level across the entire range of input signals. Unlike a linear ADC, the number of bits does not need to increase to provide additional resolution at the top end of the scale. Therefore the conversion time, which doubles with each additional bit of ADC conversion, does not have to increase.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An imager comprising:
   a plurality of pixels, wherein each pixel is comprised of a row select transistor coupled to a column of pixels;
   at least one analog element configured to provide a non-linear signal corresponding to a signal provided by at least one of the plurality of pixels, the at least one analog element coupled to at least one column of pixels; and
   a digital element configured to produce a predetermined mapping of the non-linear signal provided by the analog element.

2. The imager of claim 1, further comprising an analog-to-digital converter (ADC) coupled to the at least one analog element and the digital element and configured to provide a digital representation of an output of the at least one analog element.

3. The imager of claim 2, wherein the digital element is configured to substantially linearize the digital representation provided by the ADC.

4. The imager of claim 3, wherein the digital element substantially linearizes the digital representation provided by the ADC using a look-up table (LUT).

5. The imager of claim 2, wherein the at least one analog element is configured to have a reduced gain characteristic to prevent saturation of the analog-to-digital converter.

6. The imager of claim 1, wherein the digital element is one of a processor, an ASIC, and an FPGA.

7. The imager of claim 1, wherein the digital element is provided off-chip.

8. The imager of claim 1, wherein the at least one analog element is an amplifier having a non-linear output characteristic.

9. The imager of claim 8, wherein gain associated with the amplifier is compressed in response to higher input light levels.

10. The imager of claim 8, wherein the at least one analog element applies a variable gain to the at least one of the plurality of pixels.

11. The imager of claim 10, wherein a gain applied by the at least one analog element varies from pixel-to-pixel.

12. The imager of claim 1, wherein the at least one analog element is implemented by a multi-level breakpoint circuit that provides a multi-step linear conversion curve with a set number of breakpoints, wherein the slope of each of the curves decreases at each breakpoint.

13. The imager of claim 12, wherein positioning of each of the breakpoints and a slope from breakpoint to breakpoint are programmable by setting at least one of a reset time and a reset level.

14. The imager of claim 1, wherein the at least one analog element is implemented separately or as part of an analog CDS circuit.

15. The imager of claim 1, wherein the digital element is configured to result in a non-linear digital representation provided by the ADC.

16. The imager of claim 1, wherein the predetermined mapping produces a signal that is compressed at higher levels of the signal of the at least one of the plurality of pixels.

17. The imager of claim 16, wherein the compressed signal has a square root characteristic.

18. The imager of claim 1, further comprising a plurality of analog-to-digital converters (ADC) coupled to the at least one analog element and the digital element and configured to provide a plurality of digital representations of an output of the at least one analog element.

19. The imager of claim 18, wherein the plurality of analog-to-digital converters supports a plurality of columns.

20. The imager of claim 1, wherein the analog element is configured to provide a compressed signal corresponding to the signal of the at least one of the plurality of pixels.

21. The imager of claim 1, further comprising a plurality of columns of pixels, wherein at least one column of the plurality of columns has an applied transfer function that is different from the other columns of the plurality of columns of pixels.

22. An imager comprising:
   a plurality of pixels, wherein each pixel is comprised of a row select transistor coupled to a column of pixels;
      a first analog element coupled to at least one column having an output configured to provide a non-linear signal corresponding to a signal provided by at least one of the plurality of pixels, the first analog element coupled to at least one column of pixels; and
      a second analog element configured to produce a predetermined mapping of the non-linear signal provided by the first analog element.

23. The imager of claim 22, further comprising an analog-to-digital converter (ADC) coupled to the first analog element and the second analog element and configured to provide a digital representation of the output of the first analog element.

24. The imager of claim 23, wherein an output of the second analog element is coupled to a reference input of the ADC.

25. The imager of claim 24, wherein the second analog element is a non-linear digital-to-analog converter (DAC).

26. The imager of claim 25, wherein the non-linear DAC is supplied by a digital element configured to substantially linearize the digital representation provided by the ADC.

27. The imager of claim 26, wherein the digital element substantially linearizes the digital representation provided by the ADC using a look-up table (LUT).

28. The imager of claim 27, wherein the non-linear DAC is configured to provides a decompressed signal at higher levels of input signal corresponding to a compressed signal provided by the first analog element.

29. The imager of claim 22, wherein the first analog element is an amplifier having a non-linear output characteristic.

30. The imager of claim 22, wherein the first analog element is implemented by a multi-level breakpoint circuit that provides a multi-step linear conversion curve with a set number of breakpoints, wherein the slope of each of the curves decreases at each breakpoint.

31. The imager of claim 22, wherein the first analog element is implemented separately or as part of an analog CDS circuit.

32. The imager of claim 22, wherein the second analog element provides a compressed signal at higher levels of input signal corresponding to the signal of the at least one of the plurality of pixels.

33. The imager of claim 32, wherein the compressed signal has a square root characteristic.

* * * * *